A. D. BRIXEY.
FRAMING DEVICE FOR MOVING PICTURE MACHINES.
APPLICATION FILED FEB. 19, 1915.
1,208,740.
Patented Dec. 19, 1916.
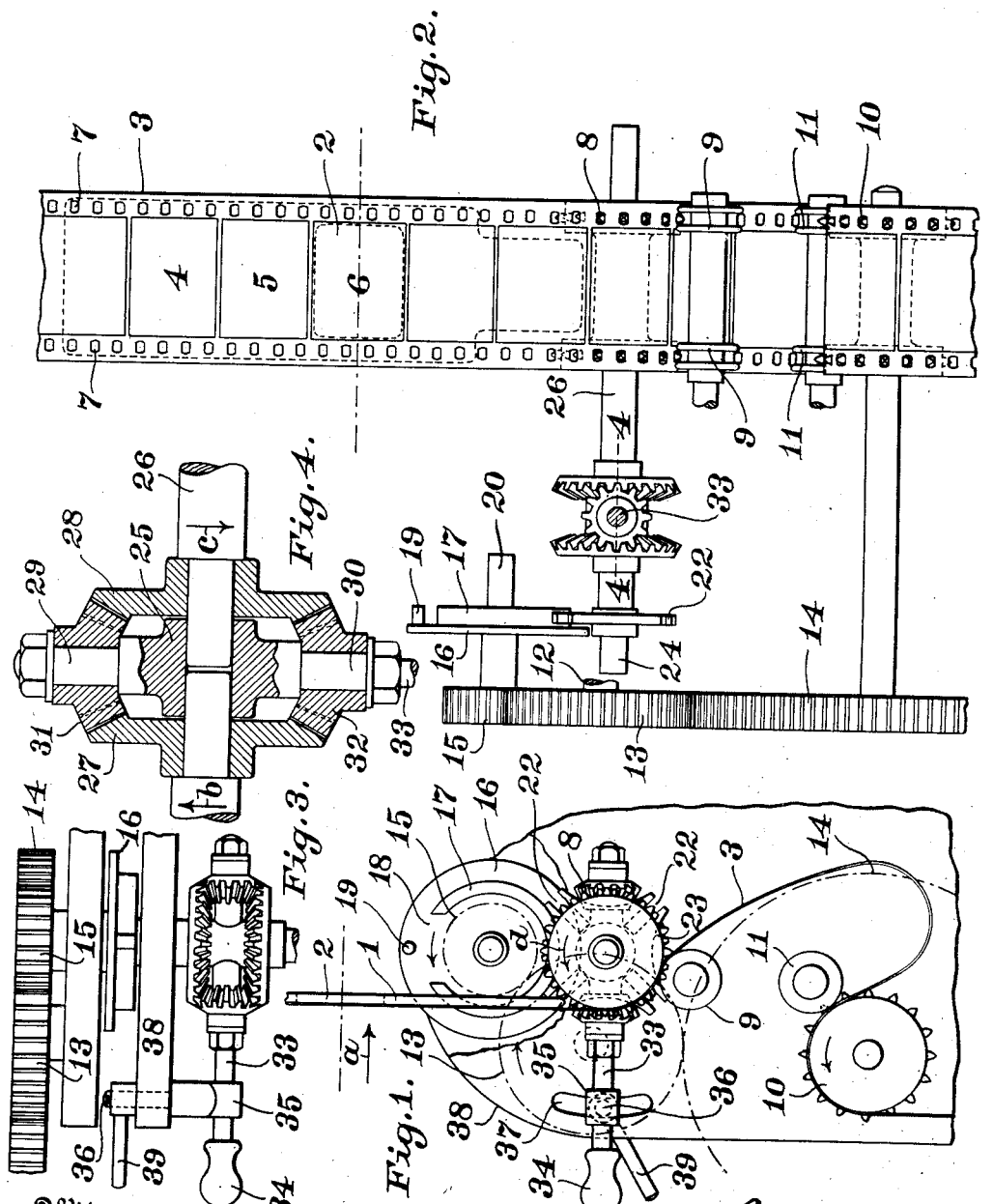

UNITED STATES PATENT OFFICE.

AUSTIN D. BRIXEY, OF NEW YORK, N. Y.

FRAMING DEVICE FOR MOVING-PICTURE MACHINES.

1,208,740.      Specification of Letters Patent.      Patented Dec. 19, 1916.

Application filed February 19, 1915. Serial No. 9,243.

*To all whom it may concern:*

Be it known that I, AUSTIN D. BRIXEY, a citizen of the United States, and resident of New York, in the county of New York and State of New York, have invented certain new and useful Framing Devices for Moving-Picture Machines, of which the following is a specification.

This invention relates to means for effecting adjustments whereby the pictures on a moving picture film are brought into proper registry with a "window" in a moving picture machine.

In moving picture machines, as is well known, the picture film is passed across the "window" of the projector, through which the projecting light passes. The sucessive pictures on the film are brought in front of the "window" with suitable rapidity and the film is moved intermittently, permitting a dwell of each picture in front of the "window" for a short interval. The film is ordinarily driven by means of a sprocket wheel, the film being held from slipping by reason of the sprocket teeth entering in holes in the margin of the film.

In order to secure the best results each picture as it comes into the line of projection should register accurately with the "window". In threading in the film, it may be secured to the driving sprocket in such relation that the pictures will register as nearly as possible with the "window" but no adjustment can be had by steps smaller than the distance between successive sprocket teeth. Furthermore, even if the pictures are in proper register with the "window" at the beginning of the film, inaccuracy in the film or machine may cause a failure of accurate registry.

The object of the present invention is to provide means whereby relative adjustments of the film and "window" may be secured with any degree of nicety while the machine is runnings or at other times.

It is a further object of the invention to provide simple and readily operable means for the purpose indicated.

Other and ancillary objects of the invention will appear hereinafter.

In the accompanying drawings which illustrate the invention, Figure 1 is a side elevation of apparatus embodying the invention with so much of a moving picture machine as is necessary to show its application thereto: Fig. 2 is an elevation of the apparatus shown in Fig. 1, viewed as indicated by the arrow *a:* Fig. 3 is a view of a detail, being a top plan view of certain of the parts of Fig. 1: and Fig. 4 is a section, on an enlarged scale, on the line 4—4 of Fig. 2.

Referring to the drawings, 1 is the front plate of a moving picture machine, having a "window" 2. Across this plate is drawn the picture film 3 having succeeding pictures represented by the squares 4—5—6, etc., and also having perforations 7 at its edges adapted to engage with the sprocket wheel 8 by which it is moved along. The film is held to the sprocket wheel by a pair of grooved rollers 9. From this sprocket 8 the film passes by a loop to a steady feed sprocket 10, being held thereto by a pair of grooved rollers 11.

The driving sprocket 8 is driven intermittently so that each picture is quickly moved forward a step in front of the "window" where it dwells for a short interval, after which it is quickly drawn out of the field of projection, the same movement of the film introducing the suceeding picture into the line of projection.

The power for driving the sprocket wheels is obtained from a shaft 12 which may be driven from any suitable force of power. This shaft carries the gear 13 which on the one hand engages with the gear 14, driving the sprocket 10 and on the other hand engaging the gear 15 which drives the sprocket 8. A "Geneva" motion is inserted in the connection between the gear 15 and the sprocket 8 to produce the intermittent motion, and also inserted in this connection is the means for effecting adjustments of the film with relation to the "window" of the machine. The Geneva motion comprises a disk 16 having an annular flange 17, with an opening 18, and a pin 19. The disk 16 is fixed upon the shaft 20 of the gear 15. The other element of the Geneva motion is a star wheel 21 having radial slots 22 in its points. Between the points the periphery of the wheel is in the form of arcs 23 which form a running fit with the outside of the flange 17. The star wheel is fixed to the shaft 24. One end of the shaft 24 is journaled in a sleeve 25 which also receives the end of the shaft 26 of the sprocket 8. The shafts 24 and 26 are thus noncontinuous and may be turned independently of each other. Between these shafts is located an adjustable connection whereby the framing may be accomplished. These shafts 24 and 26 have fixed upon them respectively the beveled gears 27 and 28. From the sleeve 25 extend trunnions 29 and 30 upon which are rotatable the beveled gears 31 and 32. These last mentioned gears each engage upon one side with the gear 27 and on the other side with the gear 28. The trunnion 30 is extended into a bar 33 terminating in a handle 34 by means of which the sleeve 25 may be turned about the axis of the shafts 24 and 26, and the gears 31 and 32 move about that axis in one direction or the other as desired. The bar 33, together with the sleeve 25 and trunnions 29 and 30, may be secured in any desired position by means of a cross head 35 through which the bar 33 passes and from which a screw 36 extends through a slot 37 in the stationary upright plate 38. The bar being at some distance from the plate, in order to firmly hold the bar a sleeve or block, through which the screw passes, is placed to abut against the cross head and plate. On the opposite side of the plate from the cross head is a lever nut 39 which may be tightened to clamp the cross head, sleeve and plate together and hold the bar 33 stationary.

If now the film is threaded into the machine in the usual way and the parts are in position as shown, shaft 12 driving the apparatus, it will be observed that the star wheel 21 is held against movement by reason of one of the arcs 23 engaging with the outer periphery of the flange 17. The gear 13 being driven in a direction as indicated by the arrow $a$ the disk 16 will be driven in the direction as indicated by its arrow, the star wheel remaining stationary and the film remaining stationary, until the pin 19 enters within one of the slots 12 of the star wheel. The point of the star wheel will then be carried along with the pin, the opening 18 in the flange permitting the passage of the star point. When the pin 19 leaves the slot the star wheel will again be locked in position until the pin 19 enters the next slot to move the star wheel along one more step. During the movement of the star wheel, as described, the gear 26 will be turned with it in the direction as indicated by the arrow $b$. The gear 27 will drive the gear 28 through the gears 31 and 32 which rotate on their trunnions, being locked in position by means as before described. The gear 28 and its connecting shaft 26 will be rotated as indicated by its arrow $c$ and the sprocket 8 on that shaft will be rotated therewith in the direction as indicated by the arrow $d$. It now appears that the sprocket 8 will move during the movement of the star wheel. During the period of dwell the picture supposed to be in the line of projection should be accurately in register with the "window." If this is not the case, the handle 34 may be released and moved up or down, as the case may be. This alters the angular relation of the shafts 24 and 26 and of the star wheel 21 and sprocket 8. This will result in advancing or retarding the film pictures with relation to the "window" as the case may be, and the apparatus may be adjusted so that at the time of dwell of the intermittent motion the picture will be accurately framed in the "window." This adjustment may be accomplished upon the threading in of the film or at any time while the film is running or while it is standing still. It not only provides a means for properly adjusting the film and driving means at the start, but if there is imperfect formation of the film, or unequal wearing of the sprocket perforations in the film, or for other reasons the picture film gets out of adjustment as it runs, adjustment may be accomplished without stopping the operation of the machine.

The film loop between the sprockets 8 and 10 provides slack which permits the film across the front of the machine to be moved backwardly without binding and a similar loop on the other side of the "window" provides slack permitting the advancement of the film.

While the invention has been illustrated in what is considered its best application, it may have other embodiments without departing from its spirit. It is not therefore limited to the structures shown in the drawings.

What I claim as new and desire to secure by Letters Patent is:

1. In a moving picture machine, the combination with a film sprocket, of driving means therefor and an adjustable connection between said driving means and said sprocket comprising a pair of beveled gears respectively fixed to a pair of rotatable shafts and a rotatably mounted gear connecting said beveled gears and adjustable about their axis, the axis of said rotatably mounted gear being normally stationary.

2. In a moving picture machine, the combination with a film driving sprocket of a beveled gear driving said sprocket, intermittent driving means, a second beveled gear driven thereby, and beveled gears connecting the aforesaid beveled gears and adjustable about their axis.

3. In a moving picture machine, the combination with a film sprocket, of driving means therefor and an adjustable connection between said driving means and sprocket comprising driving and driven shafts in axial alinement, bevel gears fixed to said shafts respectively, an intermediate bevel gear connecting the aforesaid bevel gears, a carrier on which said intermediate bevel gear is rotatably mounted, said carrier being normally stationary, coaxial with said shafts and adjustable about said shafts, and means for holding said carrier stationary.

4. In a moving picture machine, the combination with a film sprocket, of driving means therefor and an adjustable connection between said driving means and sprocket comprising driving and driven shafts in axial alinement, bevel gears fixed to said shafts respectively, a sleeve between said gears receiving the ends of said shafts, trunnions extending from said sleeve, bevel gears rotatably mounted on said trunnions and meshing with the aforesaid bevel gears, means for adjusting said sleeve about its axis, and means for holding it in adjusted stationary position.

Signed at New York in the county of New York and State of New York this 15th day of February A. D. 1915.

AUSTIN D. BRIXEY.

Witnesses:
K. G. LEARD,
M. D. LEONARD.